(12) United States Patent
Luft et al.

(10) Patent No.: US 11,729,614 B2
(45) Date of Patent: Aug. 15, 2023

(54) CONNECTION OF WEARABLE DEVICES

(71) Applicant: IPCom GmbH & Co. KG, Pullach (DE)

(72) Inventors: Achim Luft, Braunschweig (DE); Martin Hans, Bad Salzdetfurth (DE)

(73) Assignee: IPCOM GMBH & CO. KG, Pullach (DE)

( * ) Notice: Subject to any disclaimer, the term of this patent is extended or adjusted under 35 U.S.C. 154(b) by 1096 days.

(21) Appl. No.: 16/320,025

(22) PCT Filed: Jul. 26, 2017

(86) PCT No.: PCT/EP2017/068883
§ 371 (c)(1),
(2) Date: Jan. 23, 2019

(87) PCT Pub. No.: WO2018/019882
PCT Pub. Date: Feb. 1, 2018

(65) Prior Publication Data
US 2019/0268766 A1  Aug. 29, 2019

(30) Foreign Application Priority Data

Jul. 26, 2016 (EP) .................................... 16181301

(51) Int. Cl.
*H04W 12/06* (2021.01)
*H04B 1/3827* (2015.01)
(Continued)

(52) U.S. Cl.
CPC ............ *H04W 12/06* (2013.01); *H04B 1/385* (2013.01); *H04L 63/0876* (2013.01);
(Continued)

(58) Field of Classification Search
CPC ..... H04W 12/06; H04W 68/02; H04W 76/15; H04W 76/14; H04W 76/10; H04W 88/04;
(Continued)

(56) References Cited

U.S. PATENT DOCUMENTS

2012/0238208 A1  9/2012  Bienas et al.
2014/0106677 A1  4/2014  Altman
(Continued)

FOREIGN PATENT DOCUMENTS

DE   102012009430 A1   11/2013
EP   2369883 A1 *  9/2011  .............. H04W 4/00
(Continued)

OTHER PUBLICATIONS

International Search Report for International Application No. PCT/EP2017/068883, dated Oct. 11, 2017.
(Continued)

*Primary Examiner* — Khoi V Le
(74) *Attorney, Agent, or Firm* — Marshall, Gerstein & Borun LLP; Michael P. Furmanek

(57) ABSTRACT

The present invention provides a method of allowing a wearable device connected to a user equipment device to communicate with a mobile communications network, wherein the user equipment device transmits non-access stratum messages to the mobile communications network for performance of an identification and an authentication of the wearable device in the mobile communications network and monitors transmissions sent by the mobile communications network in paging occasions, wherein paging occasions for paging messages intended for the wearable device are time aligned with paging occasions for paging messages intended for the user equipment device.

13 Claims, 5 Drawing Sheets

(51) Int. Cl.
*H04L 9/40* (2022.01)
*H04W 68/02* (2009.01)
*H04W 76/15* (2018.01)
*H04W 88/04* (2009.01)

(52) U.S. Cl.
CPC ......... *H04L 63/0884* (2013.01); *H04W 68/02* (2013.01); *H04W 76/15* (2018.02); *H04W 88/04* (2013.01)

(58) Field of Classification Search
CPC .. H04B 1/385; H04L 63/0876; H04L 63/0884
See application file for complete search history.

(56) References Cited

U.S. PATENT DOCUMENTS

| | | | |
|---|---|---|---|
| 2014/0150073 A1* | 5/2014 | Bone | H04L 63/0853 726/5 |
| 2014/0169285 A1* | 6/2014 | Sagfors | H04W 76/14 370/329 |
| 2016/0021635 A1* | 1/2016 | Lee | H04L 63/18 455/411 |
| 2017/0280495 A1* | 9/2017 | Zhang | G06F 1/163 |
| 2018/0199308 A1* | 7/2018 | Liu | H04W 68/02 |
| 2019/0335420 A1* | 10/2019 | You | H04W 4/70 |

FOREIGN PATENT DOCUMENTS

| | | |
|---|---|---|
| EP | 2523503 A1 | 11/2012 |
| EP | 2547149 A1 | 1/2013 |
| EP | 2728947 A2 | 5/2014 |
| WO | WO-2012035335 A1 | 3/2012 |

OTHER PUBLICATIONS

Extended European Search Report issued to application No. EP21192755.3, dated Nov. 26, 2021.

* cited by examiner

CONNECTION OF WEARABLE DEVICES

CROSS-REFERENCE TO RELATED APPLICATIONS

This is the United States national phase of International Patent Application No. PCT/EP2017/068883, filed Jul. 26, 2017, which claims the priority benefit of European Application No. 16181301.9, filed on Jul. 26, 2016. The entire contents of each of the foregoing are incorporated herein by reference.

FIELD OF THE DISCLOSURE

The present invention relates to wearable devices having a capability for connection to a mobile communications network.

BACKGROUND

Wearable communication devices such as smart watches or fitness-trackers have become popular in recent years. In many cases wearable devices use wireless data communication in order to present information to the wearer like weather forecasts, information about the surrounding or personal communication like email or instant messaging. Most services are combined with social networks and the very essence of these services is that of connecting users with each other. On the other hand, there is a desire for wearable devices to become smaller as size is a crucial factor for the user experience of wearable devices. Most users of wearable devices also carry a powerful communication device such as a smartphone almost at any time of the day. Therefore, a typical wearable communication device scenario is that a wearable communication device is connected via short range communication radio technology such as Bluetooth® to a smartphone that acts as a gateway for the wearable device to the internet. Benefits of this scenario are, that there is no need to implement complex cellular radio technology such as LTE into a small wearable device. Especially the use of low power Bluetooth (BLE) is extending the battery life time of wearable devices far beyond a scenario in which the wearable device has to implement a complex and power consuming cellular radio technology.

Communications systems are often described by means of "layers", "planes" or "strata" based on a seven layer model was provided by the work of Charles Bachman at Honeywell Information Services, now generally referred to as the OSI model. In UMTS and LTE, a concept of a stratum referred to as the non-access stratum (NAS) has been introduced which forms the highest stratum of the control plane protocol stack of the interface between UE and a network entity, e.g. the mobility management entity, MME, for LTE. As the name suggests, the NAS is supposed to contain all functionality that is independent of the radio, i.e. may be carried over different radios ("Access Stratum", AS) without significantly changing its functionality, and does not configure the parameters of the underlying radio layers. The NAS, however, relies on the radio layers (AS) to transport NAS signaling.

The main functions of the protocols that are part of the NAS are:
- the support of mobility of the terminal
  - GUTI (Global Unique Temporary ID) reallocation
  - Authentication
  - Security mode control
  - Identification
  - Mobility Management information exchange
- the support of session management procedures to establish and maintain IP connectivity between the terminal and a packet data network (PDN, e.g. the internet) via a gateway (PDN-GW) at the edge of the operator network.
- Connection Management
  - Service request: initiated by the UE to start the establishment of NAS signaling connection
  - Paging: initiated by the network in case of downlink NAS signaling to indicate to the UE to start a service request
  - Transport of NAS messages: used for SMS
  - Generic transport of NAS messages: various other applications (e.g. Location based Services)
- Session Management
  - Bearer procedures, which are network-initiated and provide mechanisms for activation, deactivation or modification of bearers
  - Transaction-related procedures, which are terminal-initiated and provide mechanisms for:
    - requests for PDN connection establishment and disconnection
    - requests for bearer resources allocation and modification release requests NAS security is an additional function of the NAS providing services to the NAS protocols, e.g. integrity protection and ciphering of NAS signaling messages. From a protocol stack perspective, the NAS is the highest stratum of the control plane.

The security parameters for authentication, integrity protection and ciphering are tied together in a security context and identified by a key set identifier (in LTE referred to as "eKSI"). Before security can be activated, the MME and the terminal (user equipment, UE) need to establish a security context. Usually, the security context is created as the result of an authentication procedure between MME and UE.

The use of ciphering in a network is an operator option subject to MME configuration.

From a network operator's perspective wearable communication devices such as smart watches, which use a smartphone as a gateway into a cellular network, are practically invisible. Only the smartphone including the user's subscription (SIM/Subscriber Identification Module) is visible to the operator. Therefore, cellular network operators are lacking the opportunity to offer business relationships dedicated to customers with wearable devices. Also, it is not possible for an operator to optimize the cellular network for devices "hidden" behind a smartphone.

For the development of wearable devices, the size of the device and the lifetime of the battery are two very important criteria. Including a smart card (universal integrated chip card, UICC) and a cellular radio into a wearable device is unlikely to meet a user's expectations of battery lifetime and compactness. Currently most wearable devices are connected via Bluetooth (low energy profile or Bluetooth SMART or Bluetooth 4.x all with a reduced radio range up to 10 meters) with other devices like smartphones. While these Bluetooth protocols consume several times less energy than cellular radio communication, most batteries of wearable devices have to be recharged every second day. With higher power consumption the device vendor has to implement larger batteries in order to deliver the same battery lifetime. Also a removable UICC with its mechanical socket would increase the size of the wearable device. Both are in contradiction to user's demand for small wearable devices.

US 2012/0238208 A1 describes a mobile radio communication device including a short range radio transceiver. The device may form an opportunistic network, where a relaying device may be connected to a cellular radio communication system. The relaying device may provide access to the cellular radio communication system for another device using short range wireless communication technology. The other mobile radio communication device may be informed of incoming data from the cellular radio communication system via short range communication from the relaying radio communication device.

DE 10 2012 009430 A1 describes a vehicular communication device which can communicate wirelessly with a cellular telephone. The vehicular device is invisible to the cellular network.

US 2014/0169285 A1 describes an aggregating device connected to a base station with the aggregating device forming a connection to one or more other devices whereby the connected device is provided with a global identity.

US 2016/0021635 A1 describes a mechanism for connecting a device such as a parking meter via a UE with a communication link with the UE being established using, for example, an NFC link, Bluetooth or WLAN. The device to be connected may or may not include its own SIM circuit.

WO 2012/035335 A1 describes the connection of devices to a network using a UE as an intermediary with the network HLR maintaining multiple records or linking a single IMEI to multiple devices. US 2014/0106677 describes a wearable device which establishes a direct connection to a telecommunication network and also an indirect connection via a mobile device.

GENERAL DESCRIPTION

The present invention provides a method of allowing a wearable device connected to a user equipment device to communicate with a mobile communications network, wherein the user equipment device transmits non-access stratum messages to the mobile communications network for performance of an identification and an authentication of the wearable device in the mobile communications network and monitors transmissions sent by the mobile communications network in paging occasions, characterized in that paging occasions for paging messages intended for the wearable device are time aligned with paging occasions for paging messages intended for the user equipment device.

In a further aspect, the present invention provides a method of configuring a paging arrangement for a user equipment device and a wearable device connected to the user equipment device, the method comprising receiving by a mobile communications network first registration information for registration of the user equipment device in the mobile communications network, receiving by the mobile communications network second registration information for registration of the wearable device in the mobile communications network, configuration of a paging scheme for the wearable device such that paging occasions for paging messages intended for the wearable device at least partially overlap in time with paging occasions for paging messages intended for the user equipment device, and transmission of paging configuration information by the mobile communications network to the user equipment device with an indication of the at least partially overlapping paging occasions.

A wearable device in the sense of the present invention is not restricted to any device that can be worn in a specific manner only. Currently, smart watches, smart glasses and smart jewelry like rings and necklaces are often named wearable devices. However, the present invention includes a broader definition of wearable devices including devices within or attached to the human or animal's body, or on the skin. It includes all devices that are part of clothing, headdress, footwear, gloves or bags, umbrellas and other items carried around. Wearable devices can have a user interface with a purpose to inform a user extensively, like smart watches, and/or allow human-to-device interaction. A wearable can also have the sole purpose to sense one or more environmental parameter(s), e.g. sensors for vital functions like heartbeat, blood pressure or environmental sensors like audio, video, light, temperature, or humidity sensors. The term wearable device in this invention is thus a synonym for any device that has any of the mentioned restrictions in size, power, or other that let the device benefit from communicating with a mobile network in the way described herein.

It is an aim of this invention to provide an improvement to wearable devices by allowing these to be identified and authenticated by the operator network without the need to implement the device to a full cellular mobile.

This is achieved by re-using the cellular air interface of a cellular phone connected to the wearable device (UE) but implementing the layers responsible for authentication and service negotiation (NAS) in multiple instances independently for the UE and the wearable device.

For simplicity of description it is generally assumed in the following that one wearable device is logically connected to the UE and thus two distinct NAS layers are present associated with one radio interface, that of the UE, to the mobile network. This results in two alternative implementations of the invention depending on where the NAS layer that is responsible for the wearable device resides: either in the UE (as a second instance of the NAS layer in parallel to the UE's NAS layer) or in the wearable device itself (without the underlying radio interface layers).

In a first alternative, Alt 1, two NAS instances are implemented in the terminal. The UE authenticates the wearable device and provides mobility related functionality on behalf of the wearable.

The difference to current tethering arrangements is the duplication of relevant NAS layer instances in the UE to provide the network with distinct control means dedicated to the wearable device and independent of the control of the terminal.

In a second alternative, Alt 2, one NAS instance is implemented in the terminal and a second NAS instance is implemented in the wearable device.

In this alternative the wearable device is aware of the cellular network context and uses the radio resources of the terminal. Some complexity is shifted from the terminal into the wearable device (compared to Alt 1), but the implementation in the wearable device could be done in software and does not impact battery lifetime as much as a complete cellular modem would do.

According to the known state of the art, the actual identification of a subscription a device is bound to is performed by the subscriber identity module, SIM. This gives another two alternative implementations depending on where the SIM identifying the wearable device's subscription resides: either in the wearable device itself (unlikely as a SIM card; more likely an embedded SIM or eSIM) or in the UE.

In sub-alternative a, both subscriptions are implemented in the UE (multiple SIM cards, eSIMs or a combination; multiple SIMs (SIM Applications) on one SIM card; wearable device subscription derived from user's subscription) and are used each for one of the two NAS instances.

In sub-alternative b, the wearable device has an (embedded) SIM.

The combination of these alternatives results in four deployment scenarios Alt 1 a, Alt 1b, Alt 2a and Alt 2b.

Alt 1a (wearable's NAS and SIMs in the UE): the UE performs all NAS layer functionality autonomously on behalf of the wearable device in parallel to its own NAS layer activity. The wearable device may or may not be aware of the cellular network. This alternative has the least impact on the wearable device implementation. The UE may need to ensure the wearable is connected when indicating its existence in the network via NAS layer functions.

Alt 1 b (wearable NAS in the UE, SIM in the wearable): the UE performs NAS layer functionality and uses the wearable's SIM whenever it is involved in authentication mechanisms. Access of the SIM is possible using the Bluetooth SIM Access Profile for example.

Alt 2a (NAS in the wearable, SIM in the UE): the wearable device has the NAS layer implemented and performs authentication and mobility related functionality. The device accesses the SIM card in the UE whenever it is involved, e.g. for authentication. The access can again be done via BT SIM Access Profile with reverse Master/Slave assignment compared to above. This alternative has the advantage that the wearable can decide details of the authentication and mobility and still spare radio layers and a SIM card slot or the embedded SIM.

Alt 2b (both NAS and SIM in the wearable): the wearable device performs NAS layer functions including necessary access to the SIM autonomously and uses the UE's radio layers for transport of the NAS communication.

The invention solves the general problem of identifying a wearable device that does not have a cellular air interface implemented from a cellular network. The invention also describes solutions to key issues that are a result of introducing multiple NAS layers over a single radio interface and NAS and radio layer in separate devices:

aligning paging occasions (slots for potential paging) of UE and all connected wearable devices in order to save UE battery power in idle mode;

optimization of mobility related procedures using the fact that the UE and the connected device are permanently in physical proximity so that mobility related changes (cell change, tracking area change . . . ) do not need to be reported independently for both devices;

opening the cellular air interface to serve multiple NAS instances for different subscriptions, i.e. identification of source and/or target NAS within messages of the radio interface (which was not necessary in case of the legacy 1:1-mapping of NAS and AS).

Besides the control mechanisms provided by the NAS and described in this invention as an example, the actual data transmission requires further functions related to setup and maintenance of bearers and data routing.

The invention provides the benefit that the wearable device becomes a cellular network device of its own. The operator is able to:

identify the wearable device in the network,
page the wearable device in the network,
optimize the network (e.g. with network slicing) for wearable devices,
offer users of wearable devices dedicated business models.

These advantages are achieved with no cellular radio access technology implemented in the wearable device, thereby extending battery lifetime using a compact design of wearable device.

The particular alternatives referred to above each provide their own particular benefits. Alt 1 results in a low impact on the wearable device; Alt 1a has almost no impact on wearable device; and Alt1b results in a binding of subscription to the wearable device is enforced by hardware. Alt 2 has a lower impact on the UE and offers a dedicated NAS layer implementation for a specific device, Alt 2a offers potentially the most compact design of wearable device since no hardware impact, Alt 2b results in a binding of subscription to the wearable device is enforced by hardware.

BRIEF DESCRIPTION OF THE DRAWINGS

Preferred embodiments of the invention will now be described, by way of example only, with reference to the accompanying drawings in which.

DETAILED DESCRIPTION

In the following, three embodiments are described by the awareness the wearable has of the operator network from a wearable device that is aware of a 3GPP network to a wearable device that is not aware of the 3GPP network at all. Also the impact on the wearable device goes from high to no impact.

Figure 1:
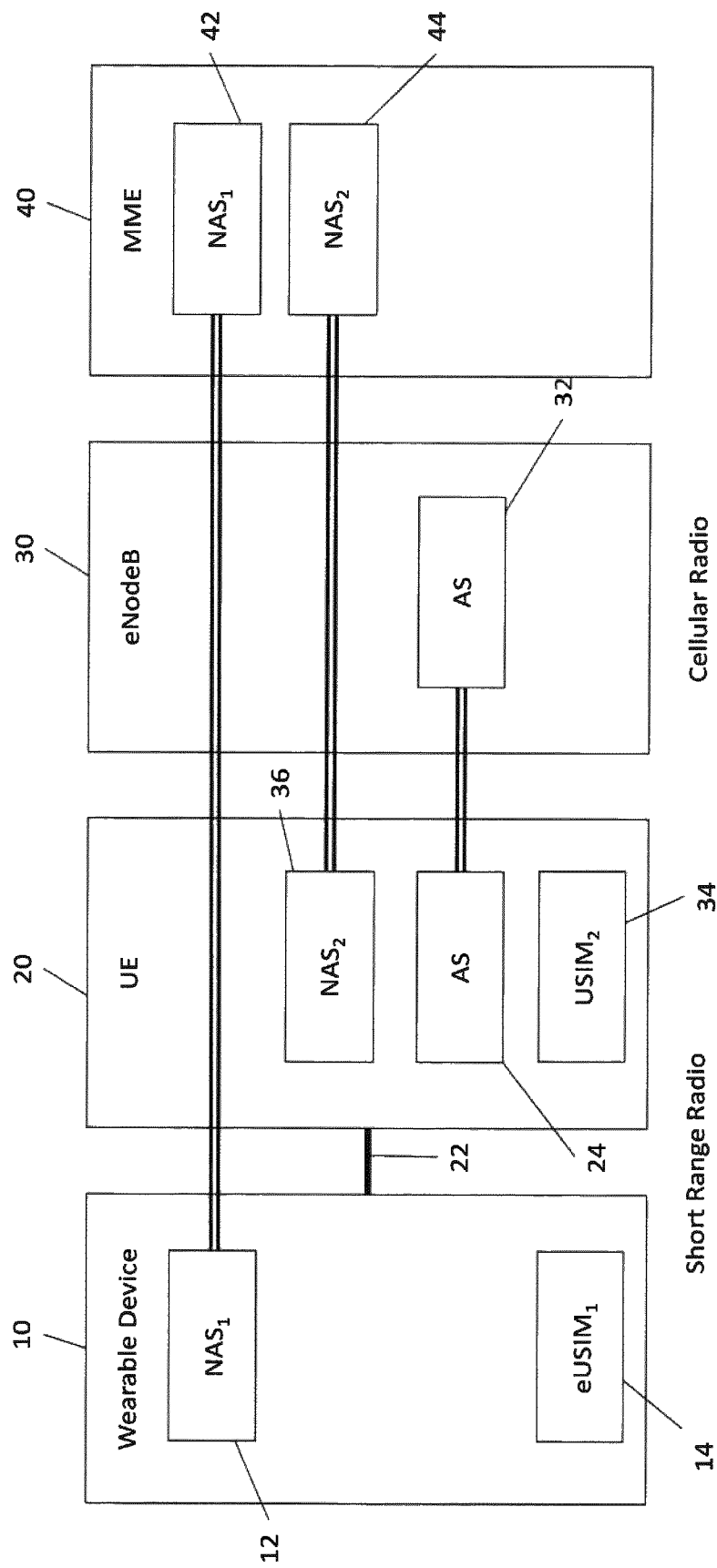
FIG. 1 shows a schematic diagram of a first embodiment of the invention.

A first embodiment of the invention is shown in FIG. 1. This embodiment relates to Alt 2b referred to above, in which a wearable device 10 has its own NAS entity 12 and its own USIM 14. The wearable device 10 communicates with a UE 20 via a local link 22. A radio interface, or AS, 24 of the UE is used as a gateway to the cellular network, in particular an AS 32 of a eNodeB 30. The UE 20 includes its own SIM, SIM 34 and a NAS 36. The eNodeB in turn communicates with an MME 40 which includes a NAS 42 corresponding to the NAS 12 of the wearable device 10 and a NAS 44 corresponding to the NAS 36 of the UE 20.

The local link 22 between wearable device 10 and UE 20 could be any type of short range radio connection; e.g. low power Bluetooth (BLE). The UE 20 receives NAS messages from the wearable device and forwards them via the cellular radio connection to the MME 40, substantially without altering them. The transport mechanism used may be similar to today's transport of NAS messages as a container within messages of the RRC protocol of the radio layers. The UE 20 includes functionality to identify NAS messages from the wearable device 10 and to identify the respective wearable (or in general the source entity of the NAS message) within the message towards the base station.

In a downlink direction the UE 20 has to receive NAS messages directed to itself and to the wearable device 10. In an idle mode the UE has to listen to paging information so that it can receive paging messages for both itself and the wearable device. In case a downlink NAS message is directed to the wearable device the UE has to wrap the NAS message into a data packet of the short range radio protocol stack and send the data packet to the wearable device via short range radio (e.g. low power Bluetooth).

In case of using Bluetooth technology the NAS messages could be transmitted using a new Bluetooth NAS profile dedicated to wrap and unwrap NAS messages and exchange NAS status information from and to a wearable Bluetooth device.

Figure 2:
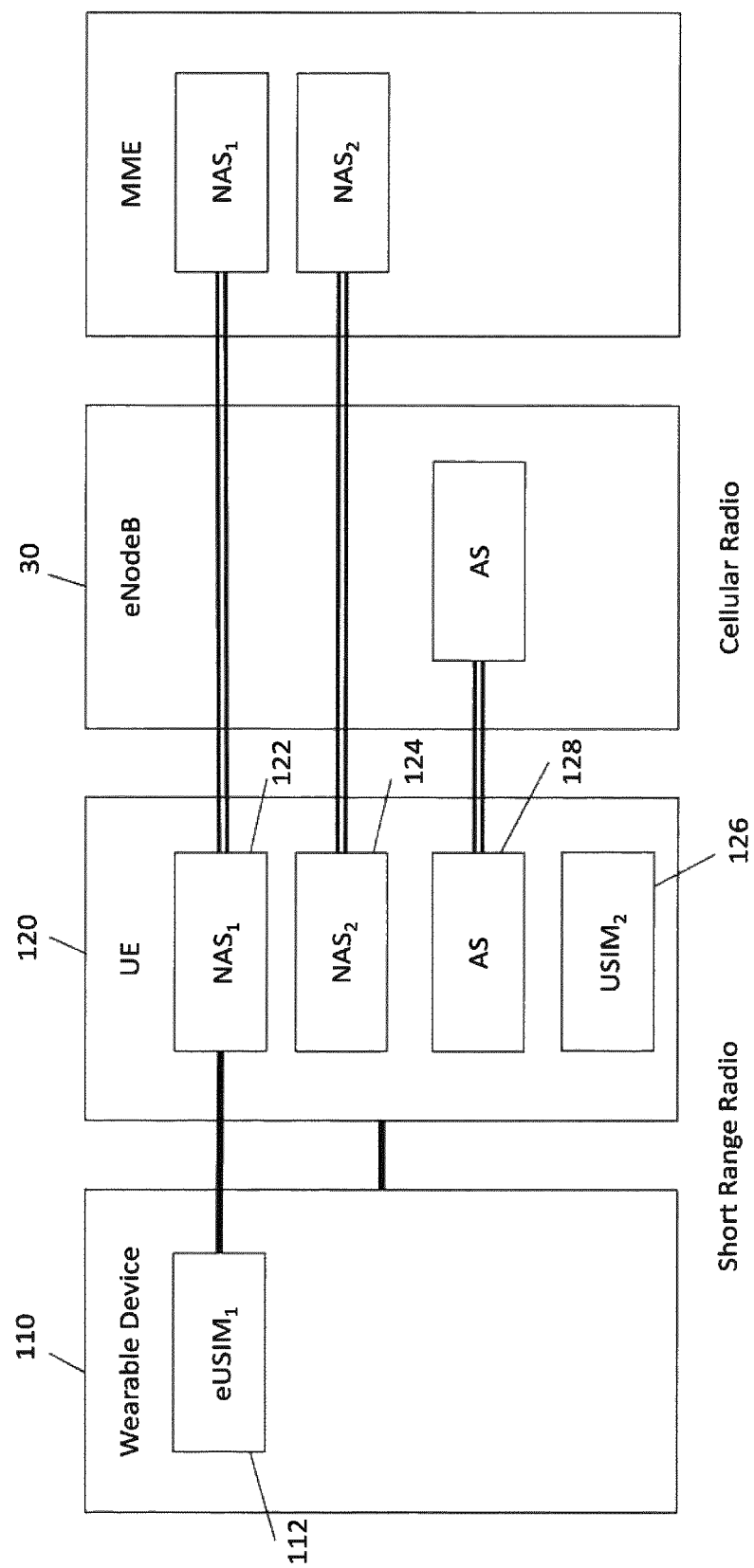
FIG. 2 shows a schematic diagram of a second embodiment of the invention.

A second embodiment of the invention is shown in FIG. 2. This embodiment implements Alt 1 b referred to above in which a UE 120 has two NAS entities implemented, NAS 122 and NAS 124. NAS 122 is used to send and receive NAS messages on behalf of a wearable device 110. As in FIG. 1, the UE 120 has its own SIM, USIM 126 and an AS 128 for communication with the eNodeB 30.

The wearable device 110 incorporates a USIM 112. This could be implemented as an embedded USIM (eUSIM). Communication between the corresponding NAS entity 122 in the UE and the USIM 112 in the wearable device could be implemented using the Remote SIM Access Bluetooth profile.

The long term shared secret key will persistently stay in the USIM of the wearable device and all derived session keys will be transferred to the corresponding protocol stack entities. In LTE, as an example, the session keys are separated for NAS and AS in the so called key hierarchy. In the AS the PDCP layer of the protocol stack has the cyphering function implemented. There is one PDCP layer instance per radio bearer. Either the AS session keys derived in the USIM of the wearable device could be used in one or more corresponding PDCP layer entities serving the data related to the wearable or the AS session keys derived in the USIM of the UE could be used for user data cyphering as the wearable device and the UE are using a shared AS protocol stack. Details on the user data routing can be found in the related section.

Figure 3:
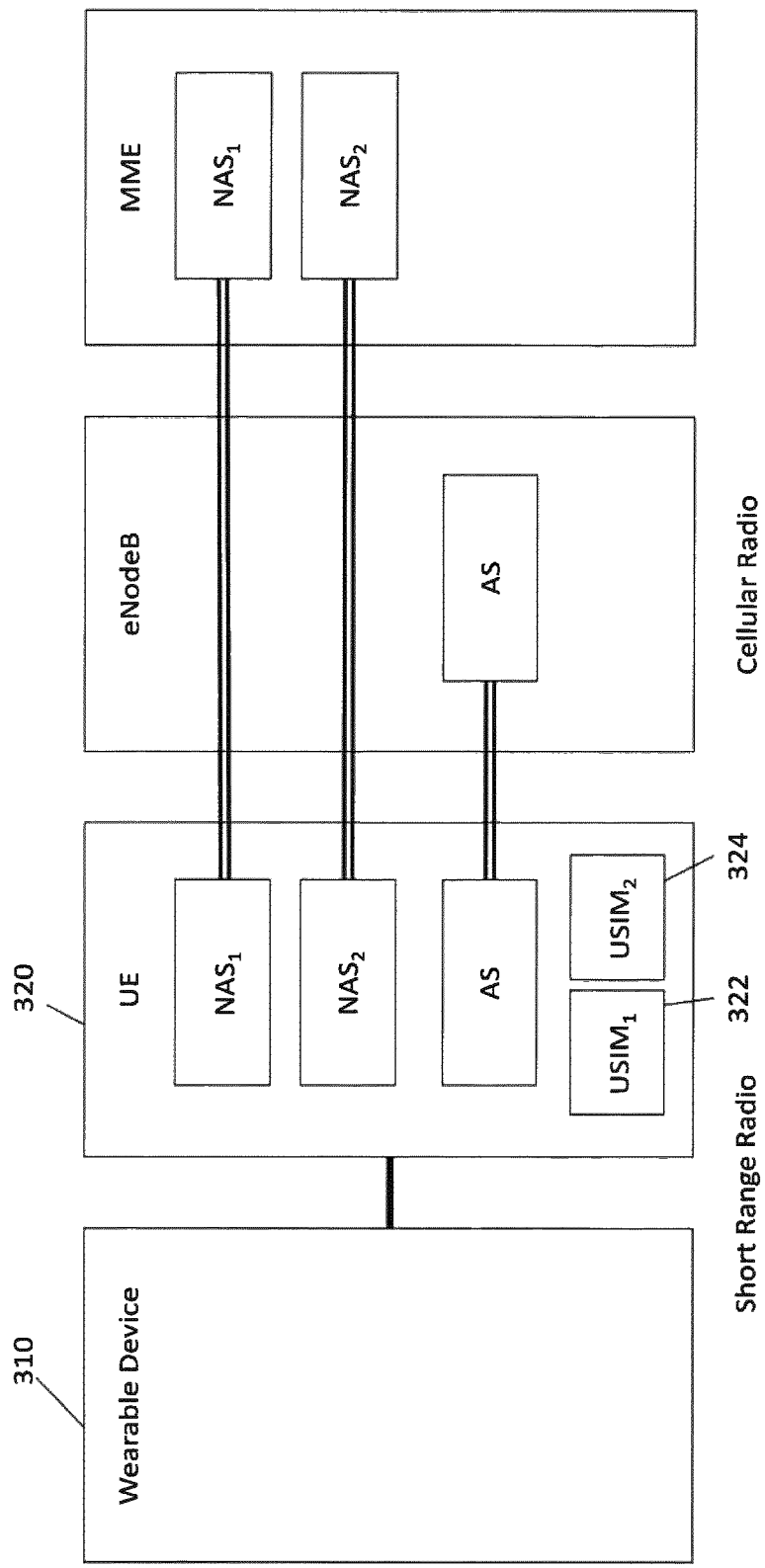
FIG. 3 shows a schematic diagram of a third embodiment of the invention.

A third embodiment is shown in FIG. 3. This embodiment has no impact on a wearable device 310 as it implements Alt 1a referred to above. All necessary entities of the cellular protocol stack are implemented in a UE 320. The UE 320 incorporates two SIMS in the form of a USIM 322 and a USIM 324. The UE 320 communicates completely on behalf of the wearable device 310. Only the actual user's payload of the wearable device is wrapped into data packets of the cellular protocol stacks. Theoretically the wearable device 310 does not need to be physically present to be authenticated. There is only a logical link between wearable device and 3GPP network. The two USIMs 322 and 324 could be two fully separated smart cards (UICCs), two different SIM entities on one UICC or USIM 324 is derived from USIM 322.

A paging procedure for implementing the arrangements described in connection with FIGS. 1-3 may be implemented as follows.

Figure 4:
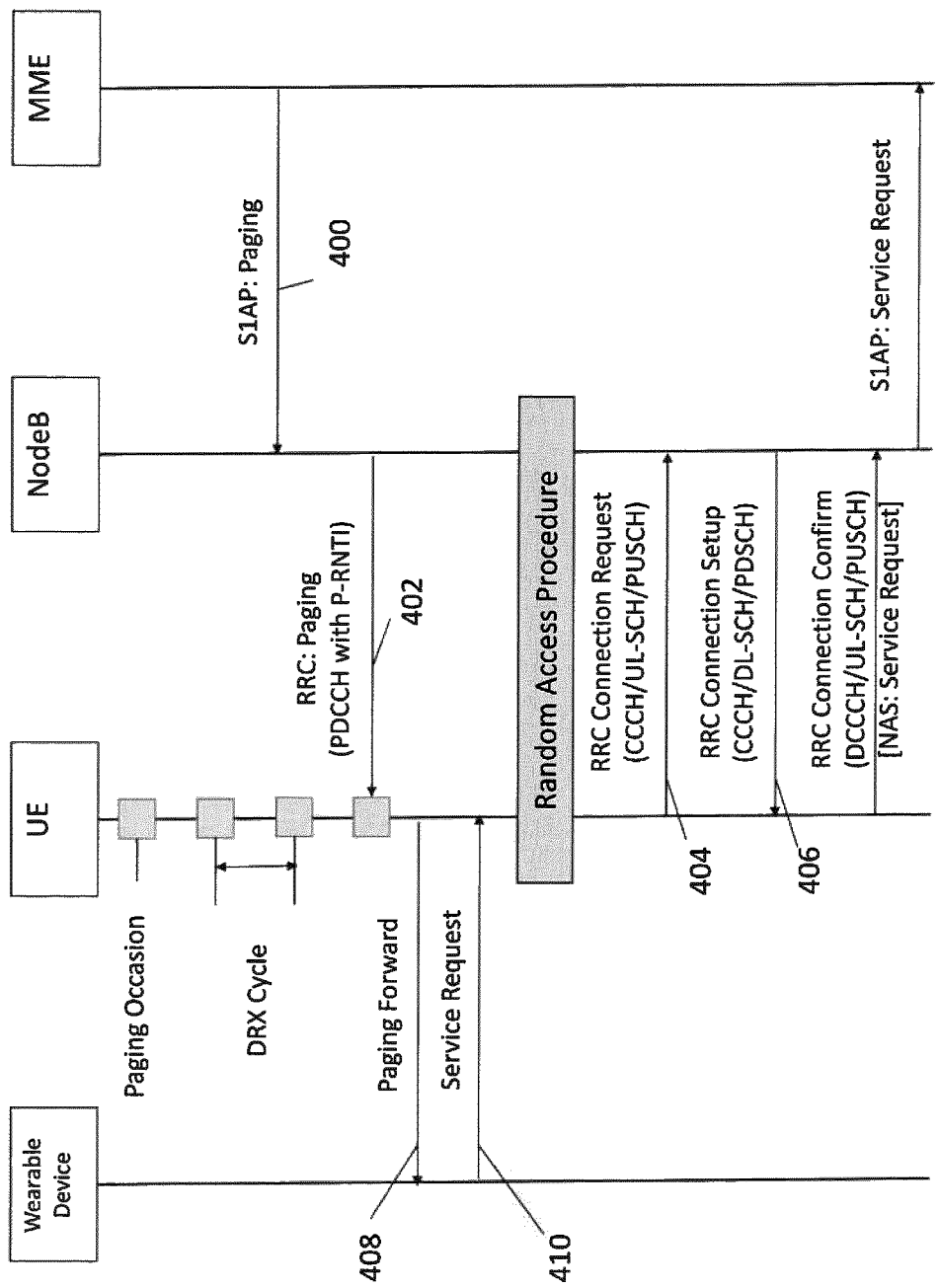
FIG. 4 is a message sequence chart showing a paging operation for a wearable device.

In FIG. 4 a message flow of an exemplary paging procedure of a wearable device as an example of a network initiated NAS messages exchange is illustrated. When the MME needs to contact the UE, it sends a paging request 400, e.g. an S1AP paging message, to the base station (eNodeB, eNB). Due to mobility management implemented in the MME, the tracking area(s) of the wearable device are/is known. Each tracking area (TA) is associated with a group of eNBs and the UE in idle mode has been reported to be in a specific TA either periodically or due to moving from one area into another. When a UE is required to connect to the network, the MME decides based on the current TA(s) of the UE to request the associated eNBs to page the UE.

As shown in FIG. 4, the MME is responsible for the initiation of the LTE paging procedure. The MME does this by forwarding the S1AP paging message 400 to one or more eNodeBs. The LTE paging procedure is applicable to UEs in ECM IDLE State. UEs in this state are in RRC IDLE mode and do not have an ongoing connection to any eNB and no eNB has an S1 connection with the MME for the UE (in other words, eNBs do not have a UE related context and do not know the UE). The MME forwards a paging message to all eNodeBs within the current TA(s) of the UE. An eNodeB receiving the S1AP paging message 400 from the MME constructs a respective RRC paging message 402. Paging message 402 can include multiple paging records to page multiple UEs.

UEs in RRC IDLE mode check for paging once every DRX cycle. Paging occasions within the paging frame define specific sub-frames during which an LTE UE checks for paging messages. The UE searches for a well-known identifier (Paging-RNTI, P-RNTI) within the PDCCH of sub-frames belonging to the paging occasion. The P-RNTI has the value of FFFE(hex) and indicates that the UE may have a paging message on the PDSCH. The UE finds the P-RNTI in PDCCH and it will decode resource allocation information. This information directs the UE to a PDSCH Radio Block wherein the paging message has been sent. The UE decodes the RRC message from PDSCH Radio Blocks and checks the UE identity in all the contained records. If the UE does not find its own identity or any identity of a connected wearable device in the paging records it will return to check PDCCH for P-RNTI at each of the successive paging occasions. If the UE finds a matching identity, it will trigger a random access procedure to establish an RRC connection.

As shown in FIG. 4, the UE sends an RRC Connection Request message 404 and the eNodeB responds with an RRC Connection Setup message 406. If the LTE paging procedure is for a PS data call, the UE includes a service request NAS message in the RRC connection setup complete message. In other cases, other NAS messages may be included. The eNodeB forwards this NAS message to the MME (as indicated in the RRC message) which will proceed to establish the connection with the UE. A paging retransmission will be triggered if a timer in MME expires prior to MME receiving a NAS message from UE.

According to the present invention, multiple devices may be connected to the UE. If the UE receives a paging message for a connected wearable device, it forwards the message to the respective NAS layer which resides either in the UE or in the connected wearable device. In FIG. 4, the forwarding is shown by message 408 The paging message is processed in that NAS layer and the response, e.g. a service request message 410, is forwarded back to the UE's radio layer. The UE performs all the RRC procedures of the AS protocol stack and forwards the service request message via the AS layers to the eNB and further to the MME.

LTE UEs in RRC IDLE mode use discontinuous reception, DRX, to reduce the power consumption. The DRX cycle will determine how frequently a UE will check for paging messages. The DRX cycle is broadcast within system information, SIB2. It can have values of 32, 64, 128 or 256 radio frames. These corresponds to time intervals of 320, 640, 1280 and 2560 ms. The UE can also propose its own DRX cycle length within ATTACH REQUEST and TRACKING AREA UPDATE REQUEST messages. The set of allowed values are the same as used in SIB2. The identities used to reference the UEs that are actually addressed within a paging message are calculated from the Mobile Subscriber Identity (IMSI) as follows: ID=IMSI mod 1024.

Thus, one aspect of the present invention is the addressing of multiple subscribers connected over a single receiver within one paging message. In an aspect of the invention, the UE searches for multiple identities on the respective paging channels to read all paging messages relevant for itself and all connected devices.

In case the RRC Paging occasions of the connected wearable devices are not aligned with the DRX cycle of the UE, the UE has to listen to more RRC Paging occasions which increases the power consumption of the UE in idle mode. Thus, it is beneficial to define overlapping paging occasions for a UE and send all paging messages for this UE and for all connected wearable devices (each with a separate identity in order to distinguish between the different paging messages) during the paging occasions of the UE.

Therefore, one further aspect of this invention related to paging is the configuration of same, identical or overlapping paging occasions for a UE and a connected wearable. This procedure could comprise the following steps:

1) Reception of a first (e.g. registration) message from a UE in the Core Network to register the UE in the NW, subsequent registration procedure including configuration of the paging (occasions).

2) Reception of a further registration message from the same UE (forwarded from a wearable or generated by the UE) in the Core Network to register a connected wearable device in the NW.

3) Configuration of the paging information in the NW with respect to the wearable device so that the paging occasions overlap or they are identical to the configuration of the UE in step 1).

4) Transmission of the paging re-configuration to the UE as part of the registration procedure with implicit or explicit indication of the overlapping or identical paging occasions. The configuration then overrides the configuration that resulted from step 1).

Alternatively, both registrations are performed with one NAS message and the answer from the NW is also using collective messages with essentially the same information as the separate messages described above.

One alternative to this embodiment is an alternative configuration of the paging identity (in contrast to the implicit definition via IMSI) on the network side so that paging for a wearable uses the identity of the connecting UE. As a result, the basic paging procedure would be unchanged compared to that currently implemented. In order to allow the UE in that case to distinguish between paging meant for the UE and paging for the wearable, in this case at some point in or after the connection setup procedure the network would have to indicate to the UE that the wearable is the addressed device. This can be done as part of the control header information in the first DL NAS message which could be included in the message to differentiate different addressed NAS layers or devices. The respective information can be present for all configurations of the enhanced mobility NAS layer. Alternatively, the existence of such information can be configured by the NAS during registration of the UE or after registration of a second (or third . . . ) device in the network.

For addressing multiple devices connected to a single receiver via paging, a single paging identity may be used with different NAS entities being used to address specific devices, i.e. one paging ID for two or more devices but not one for all (as the P-RNTI on the paging control channel).

NAS entities may be NAS protocol instances within one physical core network entity (MME) or multiple physical core network entities (MMEs). A UE receiving paging messages addressed to the UE, derives a device identity from the content of the paging message and forwards the message or information derived from the message to the appropriate connected device.

For the configuration of paging occasions of different devices, the following steps are relevant. The devices are registered to a network and a configuration is performed so that paging occasions overlap or are identical. With configuration of multiple device specific paging identities to a UE/receiver, the UE/receiver listens to multiple identities and the UE forwards paging messages received based on different identities than the UE's.

Radio layers may serve multiple NAS entities, for example at registration.

In legacy cellular mobile communication standards there is exactly one non-access stratum (NAS) above the respective radio layers (AS). Thus, for every piece of data coming from the NAS which needs to be transported over the AS the source and target NAS are implicitly clear. On the network side a single MME with a single NAS entity is associated with each UE at registration and for UEs in connected mode the base BS known the respective MME.

In some setups of prior-art multiple upper layers need distinction. E.g. when a UE is connected to multiple Core Networks of different type, e.g. 3GPP NAS or CDMA 2000, a need to distinguish the source and/or target NAS entity arises. This is done in the LTE AS by using a few bits for indicating the choice between three upper layer types in the message that is used for transparent transmission of the actual NAS layer data.

A new aspect of the current invention is the usage of a UE's radio layers (AS) for multiple devices, thus it is necessary to distinguish the source or target devices of a NAS message.

In the downlink (DL) direction, the base station (eNB) has to indicate to the UE the target device NAS layer that is addressed with a message.

In the uplink (UL) direction, the UE has to indicate to the BS from which device's NAS layer a message is originating to address the correct core network entity.

In addition, if the respective core network entity (e.g. MME) implementing the NAS layer entity for a device is not reachable by the BS, the UE may indicate a device type of the originator of a NAS message to the eNB to allow proper selection of an alternative core network entity (which will fetch the context from the old entity subsequently according to prior-art). This is relevant for example when a UE reselects a new eNB that is not connected to the old MME so that the eNB has to select a new MME.

The indication can be done with a few bits signalled in the same AS message that also carries the NAS data, e.g. in LTE an RRC DLInformationTransfer and RRC ULInformationTransfer message, respectively.

The solutions of the current invention only need to be implemented by UEs that are capable of connecting to wearable devices and serving them as transport device of NAS messages to the core network. Therefore, it is proposed to indicate a capability informing the network about whether connected wearable devices are supported by a UE and if, how many such device can connect through the UE. As an example, a two-bit value indicating no support, one, two or four devices would suffice. In reverse, the network may configure the UE to allow only a maximum number of connected devices at any given time. This allows the network to limit the number of connected devices in its network or limit the number of connected devices allowed via a single UE to comply with a current or a general network capability or ensure efficient network setup.

Once the network is informed about the UE's remote device capability, the existence of the field in which the NAS layer instance is indicated in the NAS transport message can be configured. I.e. the field for distinction of one out of two or four NAS layers can be used only as a function of a configuration by the network so that a setup without remote devices does not waste radio resources for the indication.

After registration of a wearable device, the AS would need to allocate a reference ID within the signalled data to the wearable's NAS communication, i.e. reference IDs need to be configured that each point to a NAS layer entity. An alternative is pre-defined implicit allocation of e.g. reference one (1) points to the UE's NAS and reference two (2) points to a single remote device in case only one remote device is configured. However, if several remote devices are present an allocation needs to map the devices to reference IDs.

Figure 5:
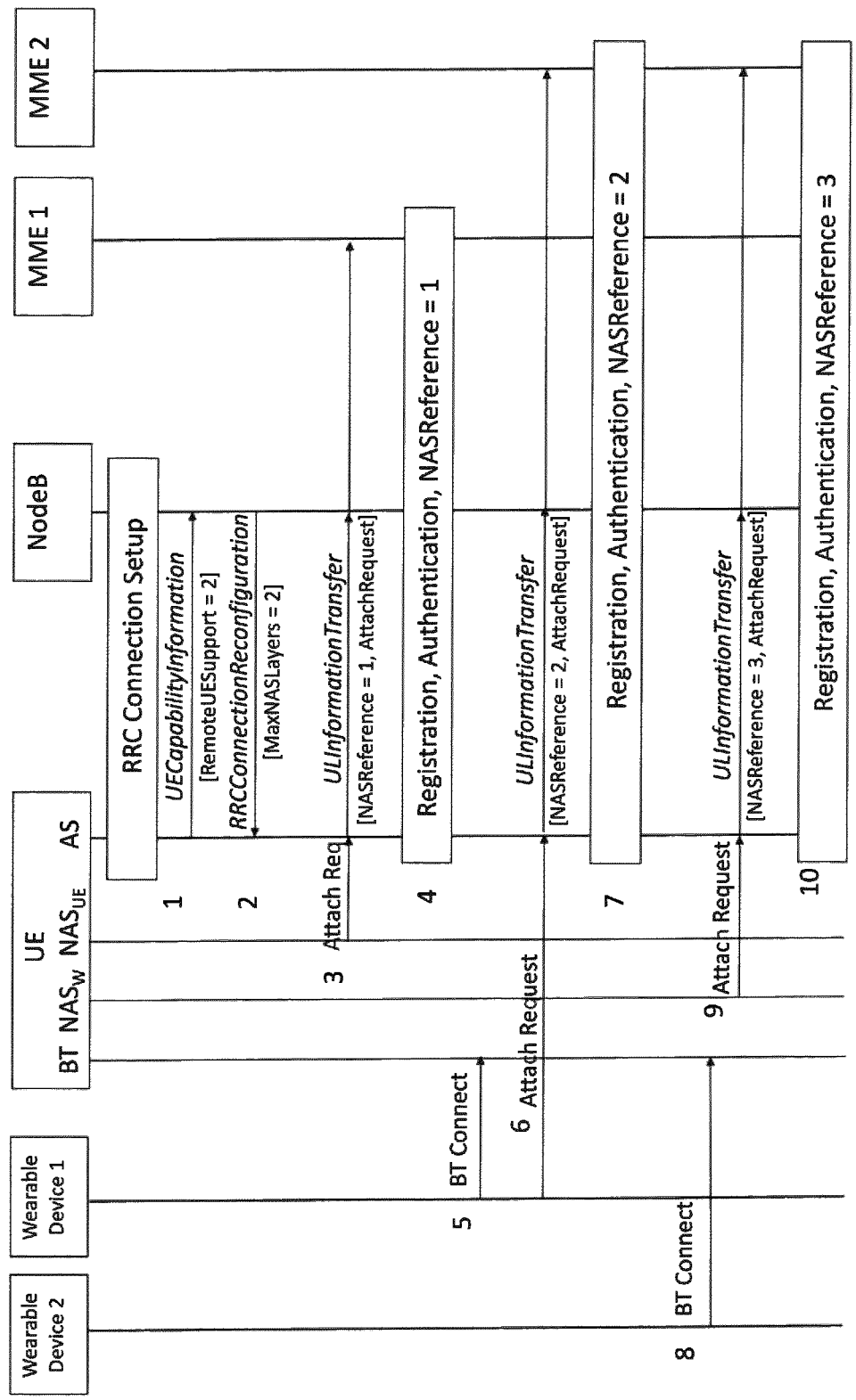
FIG. 5 is a message sequence chart showing a registration of multiple wearable devices.

FIG. 5 shows example wise a communication on AS level between UE and eNB based on an LTE architecture with the following steps:

1) UE establishes an RRC Connection and provides the UEEUTRACapability with the UECapabilityInformation message that contains in addition to all legacy information a two-bit field "RemoteUESupport" indicating the support of two remote devices RemoteUESupport Choice{0,1,2,3}=2

2) The eNB provides a configuration parameter to the UE that sets the maximum number of NAS layers supported by the RRC protocol to three which corresponds to the maximum of two remote device that will actually be supported (the number could be different from the indicated capability, the chosen numbers are just examples)

MaxNASLayers Choice{1,2,3,4}=3

3) UE registers itself on NAS level using the mobility management protocol. It sends an Attach Request message to the MME in the core network. To transport this NAS message, the AS in the UE, i.e. the Radio Resource Control (RRC) protocol, receives the message from the UE's NAS ($NAS_{UE}$) and compiles an ULInformation-Transfer message. The message contains an information item "NASreference" indicating the NAS instance of the UE.

NASreference Integer(1 . . . 4)=1

The eNB selects an appropriate MME (MME 1) and forwards the NAS message. The selection may differ from known systems in that a device type indication sent by the UE is taken into account. The device type may be implicit (e.g. the NASreference 1 points to a UE whereas >1 points to remote device) or explicitly signalled on RRC protocol level in addition to the NASreference. In addition, the eNB stores the mapping of the received NASreference to the selected MME for future NAS communication.

4) The NAS in the core network performs a registration of the UE. Any further communication regarding this registration procedure or further NAS signalling between MME and the UE's NAS in UL and DL contains the NASreference=1 in the respective RRC message to allow UE and eNB correct routing of the message to the NAS entity.

5) A wearable device (1) connects to the UE via BT, the device has a NAS layer implemented.

6) The wearable device triggers registration of itself on NAS level using the mobility management protocol providing an appropriate Attach Request message to the UE. To transport this NAS message, the AS in the UE, i.e. the Radio Resource Control (RRC) protocol, receives the message from the wearable's NAS and compiles an ULInformationTransfer message. The message contains an information item "NASreference" indicating the NAS instance of the wearable and may also contain a device type indication.

NASreference Integer(1 . . . 4)=2

The RRC protocol in the eNB selects an appropriate MME (MME 2) and forwards the NAS message. In addition, the eNB stores the mapping of the received NASreference to the MME for future NAS communication.

7) The NAS in the core network performs a registration of the wearable. Any further communication regarding this registration procedure or further NAS signalling between MME and the wearable's NAS in UL and DL contains the NASreference=2 in the respective RRC message to allow UE and eNB correct routing of the message to the NAS entity.

8) Another wearable device (2) connects to the UE via BT, the device does not have a NAS layer implemented.

9) UE registers the wearable device on NAS level using the mobility management protocol. It sends an Attach Request message to the MME in the core network. To transport this NAS message, the AS in the UE, i.e. the Radio Resource Control (RRC) protocol, receives the message from the wearable's NAS in the UE ($NAS_W$) and compiles an ULInformationTransfer message. The message contains an information item "NASreference" indicating the NAS instance of the UE and optionally a device type.

NASreference Integer(1 . . . 4)=3

The RRC protocol in the eNB selects an appropriate MME (again MME 2) and forwards the NAS message. In addition, the eNB stores the mapping of the received NASreference to the MME for future NAS communication.

10) The NAS in the core network performs a registration of the wearable. Any further communication regarding this registration procedure or further NAS signalling between MME and the wearable's NAS in the UE in UL and DL contains the NASreference=3 in the respective RRC message to allow UE and eNB correct routing of the message to the NAS entity.

The aspect of the invention of multiple NAS using a single AS provides the following benefits:

Indicating by a UE the support of multiple NAS entities over the UE's radio and/or the number of entities supported Optionally in return configuration of multiple NAS entities or a maximum of the number of NAS entities and/or respective NAS entity IDs.

In a UE connected to different remote devices, receiving messages destined to be transmitted to the core network from multiple NAS entities in a single radio transmitter and transmitting the messages Sending as part of the radio transmission an identity of the source NAS entity Sending as part of the radio transmission a type identifier for the type of device being the source of the NAS message Receiving in a BS a message over a radio receiver that contains multiple messages destined for different NAS entities in the core network and forwarding the messages appropriately Receiving in a UE a message over the radio receiver that contains a NAS message and a NAS entity identifier and forwarding the message to the right entity which may include forwarding over BT to a different device The invention provides an optimization of mobility procedures.

A cellular network is basically a radio network consistent of multiple cells spanned by base stations. Each base station covers a geographical area. By overlapping the coverage of the base stations, a cellular network provides a radio coverage over a much wider area, e.g. a country. In order to use an efficient paging mechanism a UE in Idle mode is paged for connection setup only in a subset of all cells. To also reduce mobility signalling for change of cells for UEs in idle mode (without active communication) several neighbored cells are grouped together. A UE in idle mode is able to move within an area of grouped cells without reporting the movement to the network. These areas are called location area in GSM, routing area in UMTS, and tracking area in LTE. In LTE, a UE is configured a list of tracking areas and it has to report its location only if it enters a tracking area that is not in its configured list.

The tracking area update (TAU) procedure allows a UE in idle mode to inform the cellular network about movement to a tracking area outside of its list. The UEs are responsible for detecting tracking area codes (TAC). When a UE finds that the TAC is outside its configured list, it performs an update by sending to the network a TAU request, together with its identity, e.g. the Temporary Mobile Subscriber Identity (TMSI). The corresponding network entity responsible for mobility management in LTE is called Mobility Management Entity (MME).

UEs are required to regularly report the current location (cell) periodically even if the TAC has not changed. The tracking area updating procedure is always initiated by the UE and is used for the following purposes:

normal tracking area updating to update the registration of the actual tracking area of a UE in the network;

periodic tracking area updating to periodically notify the availability of the UE to the network;

MME load balancing;

to update certain UE specific parameters in the network;

recovery from error cases;

to indicate to the network that the UE has locally released EPS bearer context(s).

Since the wearable device has an own NAS entity the mobility management of the wearable could be completely separated from the mobility management of the UE. Due to the fact that the wearable device and the UE will always be in proximity to each other there is potential for optimizations taking advantage of the proximity.

There are basically two optimization solutions. In a first simple solution the UE is sending a separate TAU request message for each involved device. The messages can be sent within the same radio layer message and thus take advantage of a collective transport. If the mobility management layer of the different devices resides in different MMEs, the respective TAU requests will each be addressed accordingly.

It may happen that after cell change a UE appears in a cell whose base station does not have a connection to the NAS entity (MME) associated with the UE. In that case the legacy indication of the last registered MME does not help the BS to route the NAS message. Instead the message will be routed to a new MME selected by the BS. In order to optimize the MME selection in the BS in that case for the remote/wearable devices, a device type indication or requested NW type indication could be added to the message.

In a second solution with more implementation impact, the UE performs a common tracking area update procedure for both the UE itself and on behalf of the wearable devices. The tracking area update procedure has to be enhanced in a way that it is possible to perform a location update for a list of TMSIs instead of a single TMSI (or similar UE identity).

Several options for signalling exist:
1) The UE sends an explicit list of TMSIs to update for each TAU.
2) The network (MME) has a static list building a group of devices (TMSIs) stored and each TAU received from the UE is taken as a TAU for the full group of devices.
3) The network (MME) has a dynamic list of devices (TMSIs) that is updated by the UE depending on current state of the wearable devices.

Options 1) and 3) have the benefit that the UE could check whether the wearable device is still connected to the UE each time before sending a TAU on behalf of the wearable device. The check can use existing means, e.g. verifying that the radio connection is still active or polling the wearable to send an alive indication. This ensures the TAU updates the network to the actual state of the wearable.

Information about groups of devices could be static on subscriber basis; e.g. stored in the Home Subscriber Station (HSS). An update during TAU procedure could also update the HSS entry. Alternatively, the HSS only contains devices that are allowed to be updated by a subscriber. The actual group of devices updated is indicated in each TAU request message. The MME checks any status update against the HSS entries to ensure that only registered wearables are updated by the UE.

On the network side the UE's NAS layer in the respective MME will receive the TAU for the list of devices. It can process the update regarding the UE with legacy procedures but will have to forward the TAU regarding the other devices to their respective NAS entities for processing. These NAS entities can reside in the same or a different MME.

The optimizations above are most effective if the mobility management of all mobile devices are terminating in the same MME. But this is not necessarily the case. For the next generation (5G) of 3GPP technology it is most likely to introduce so called network slicing. The network is divided into several subnetworks (slices) each optimized for a special purpose; e.g. internet of things, low/no mobility, broadcasting only. Network slicing increases the possibility that a UE and connected wearable devices are served by different MMEs.

In this case the UE always sends the combined tracking area update to the MME serving the UE. The MME in this case has to forward the corresponding tracking area updates of connected wearable devices to their respective MMEs. In LTE this would be a new and inventive "tracking area update forward message" over the S10 interface between two MMEs of the same network.

The invention provides the following benefits in respect of mobility management.

Transmit NAS messages for several devices, e.g. TAU requests, from a single UE within a single radio layer message, e.g. an RRC protocol message, to a base station (BS).

The single radio layer message including an address of the receiving NAS entity, e.g. the NAS entity in the MME.

The single message may include an implicit or explicit device type indication, e.g. UE or remote/wearable device.

The base station then forwards the different NAS message to respective NAS entities, if these are reachable. Otherwise they are forwarded to an entity selected by the BS, the selection may be based on the respective device type.

Synchronize the NAS entities on UE side

When a NAS entity on the UE-side initiates a NAS procedure, trigger the other NAS entities on UE-side to initiate the same procedure to be in sync with the status changes in the UE and the network side.

Transmit a NAS message valid for multiple devices to a single NAS entity, e.g. in the MME.

The NAS message may contain a list of device identifications for devices relating to the message content, e.g. a TAU request message.

The NAS message may contain a list of device identifications for devices not (not any more) relating to the message content, eliminating the devices from a list stored in the NW-side NAS entity.

The NW-side NAS entity may have a list of devices additionally allowed to be addressed by the UE and check received device lists in NAS messages for allowance.

The NAS entity forwards either the NAS message or a related information, e.g. a device state update, to the respective NAS entity of additional devices.

The invention claimed is:

1. A method of allowing one or more wearable devices to communicate with a mobile communications network, the method comprising:

transmitting, by a user equipment device, non-access stratum messages to the mobile communications network for identifying and authenticating the wearable device, wherein the wearable device is connected to the user equipment device;

monitoring, by the user equipment device, in paging occasions transmissions sent by the mobile communications network for paging messages intended for the wearable device and the user equipment device;

wherein the paging occasions for the paging messages intended for the wearable device and the user equipment device are aligned in time;

monitoring, by the user equipment, a number of instances per paging cycle for the paging messages intended for the one or more wearable devices and the user equipment device, wherein the number of instances per paging cycle is less than or equal to a total number of the one or more wearable devices; and performing a tracking area update procedure in which a single tracking area update message is sent for multiple devices of the user equipment device and the wearable device.

2. The method according to claim 1, wherein the user equipment device includes a subscriber identity module entity assigned to the wearable device.

3. The method according to claim 1, wherein the wearable device includes a subscriber identity module entity.

4. The method according to claim 1, wherein a first paging message for the wearable device and a second paging message for the user equipment device each use an identity of the user equipment device.

5. The method according to claim 1, wherein subsequent to the paging messages intended for either the wearable device or the user equipment device being transmitted, a control message is sent identifying either the wearable device or the user equipment device.

6. The method according to claim 1, further comprising:
following the identification and authentication of the wearable device, identifying a source or target of a non-access stratum message using a reference value, the user equipment device and the wearable device having different reference values.

7. The method according to claim 1, wherein the paging occasions for the paging messages intended for the user equipment device and the paging occasions for the paging messages intended for the wearable device at least partially overlap.

8. The method according to claim 7, wherein the paging occasions for the paging messages intended for the user equipment device and the paging occasions for the paging messages intended for the wearable device are the same.

9. The method according to claim 8, wherein the paging messages intended for the user equipment device and the paging messages intended for the wearable device are distinguishable by a content of the paging messages.

10. A method of configuring a paging arrangement for a user equipment device and a wearable device, the method comprising:

receiving, by a mobile communications network, first registration information for registration of the user equipment device in the mobile communications network;

receiving, by the mobile communications network, second registration information for registration of the wearable device in the mobile communications network, wherein the wearable device is connected to the user equipment device;

configuring, by the mobile communications network, a paging scheme for the wearable device:
paging messages intended for the wearable device and the user equipment device,
defining overlapping paging occasions for the wearable device and the user equipment device, and
overlapping in time paging occasions of the paging messages intended for the wearable device and the user equipment device; and transmitting, by the mobile communications network, the paging configuration information to the user equipment device with an indication of the paging occasions that at least partially overlap.

11. The method according to claim 10, wherein the paging occasions for the paging messages intended for the wearable device are identical to the paging occasions for the paging messages intended for the user equipment device.

12. The method according to claim 10, wherein the paging configuration information comprises explicit information of overlapping paging occasions.

13. The method according to claim 10, wherein the paging configuration information comprises association information associating paging information of the wearable device with paging information of the user equipment device.

* * * * *